Sept. 22, 1964  R. F. COLES ETAL  3,149,990
HEAT-SENSITIVE COPY-SHEET
Filed Jan. 19, 1962
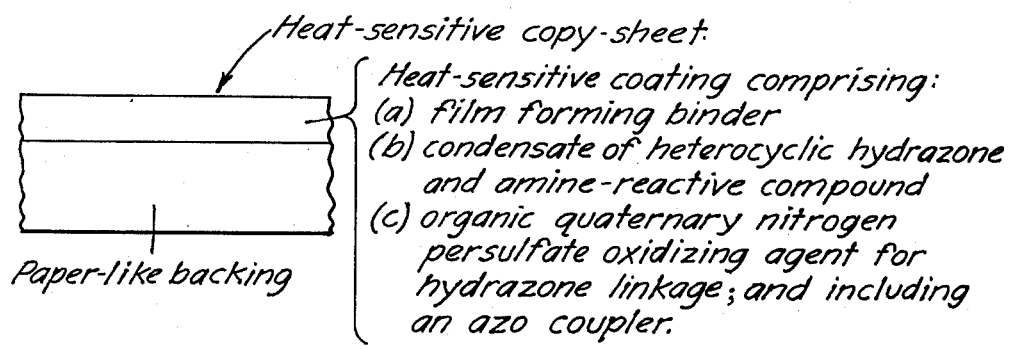
INVENTORS
ROBERT F. COLES
RICHARD A. MILLER
BY
Carpenter, Abbott, Coulter & Kinney
ATTORNEYS 3,149,990
HEAT-SENSITIVE COPY-SHEET
Robert F. Coles, East Oakdale Township, Washington County, and Richard A. Miller, St. Paul, Minn., assignors to Minnesota Mining and Manufacturing Company, St. Paul, Minn., a corporation of Delaware
Filed Jan. 19, 1962, Ser. No. 167,432
9 Claims. (Cl. 117—36.8)

This invention relates to the thermographic reproduction of graphic originals, such for example as printed or typewritten correspondence, sketches, drawings and the like, and has particular reference to novel heat-sensitive copy-sheets for use therein. This invention is related to, and is an improvement over, the invention of Coles, Tulagin and Miller described in application Serial No. 847,101, filed October 19, 1959, now U.S. Patent No. 3,076,721. A commercially important thermographic reproduction process involves brief irradiation of the graphic original with high intensity radiation differentially absorptive thereon, and formation of a visible reproduction of the resulting heat-image on a heat-sensitive copy-paper in heat-conductive pressure-contact therewith. The present invention has particular reference to novel heat-sensitive copy-paper useful in such reproduction process, to methods of making the same, and to certain unique preferred reactant materials employed therein. Specifically, there is involved a new class of heat-sensitive thermographic copy-sheets in which the image areas formed comprise an azo dye produced from components including a reactant containing the hydrazone linkage by reaction involving oxidative cleavage induced by a particular class of organic persulfate oxidizing agents.

Azo dyes are available in a wide variety of colors, provide good stability toward normal environmental influences such as light and humidity, and form effective image areas. Commercial light-sensitive copy-papers containing azo-dye-forming components are in wide-spread commercial use. Exposure of the sheet to actinic radiation through a positive original, followed by chemical treatment with reactive liquid or vapor, develops a positive copy in which the image areas, corresponding to the image areas of the original, are formed of azo dye. In such papers the reactant material is decomposed by actinic radiation, and the sheet prior to use must therefore be stored under dark conditions. The heat-sensitive copy-sheets of the present invention are essentially insensitive to light and may be handled and stored in the light without discoloration or loss of heat-sensitivity.

A considerable variety of reactions for the preparation of azo dyes is known. In general, these reactions are carried out in solution. The preparation normally involves the formation of a diazonium compound followed by reaction with an azo coupling component, frequently in an alkaline environment, to produce the colored product. One known procedure for forming the diazonium compound involves oxidation. An aromatic sulfonhydrazide is first oxidized with a suitable oxidizing agent; the resulting diazosulfone couples under alkaline conditions with phenolic azo coupling components. Thus, mixing the sulfonhydrazide, coupler, and oxidizing agent in aqueous alkaline solution or in appropriate organic solvent results in the immediate formation of a corresponding dye material.

It has been found that certain combinations of normally stable reactants capable of forming azo dyes by oxidative coupling reactions may be employed as the color-forming reactant materials in dry heat-sensitive thermographic copy-sheets. The product does not discolor nor lose heat-sensitivity on long continued normal office handling and exposure. It provides clear permanent copies of high contrast and sharp detail. No solutions, fumes or vapors, or other analogous image-developing agencies are required; application of the heat-image by dry thermographic copying procedures is sufficient to produce an immediate direct permanent copy.

The color or hue of an azo dye formed from a specific diazonium compound and specific coupler component may ordinarily be predicted with considerable accuracy based on the chemical structure of the resulting dyestuff. Although such predictions are successful with many of the oxidative coupling systems useful in the present invention, certain preferred systems are found to produce colored products which are very much darker in hue than would be predicted based on the normally expected structure. It has thus been found possible to provide white or very slightly colored copy-papers which when heated, as in thermographic copying, produce image areas of unexpectedly dark hue, providing copy of excellent readability.

These preferred copy-papers have the additional advantage of requiring only two reactive components, namely, an oxidizing agent and a color-producing component. The latter is a composite condensation product of an azo coupler component and a diazo-forming component, which, under the influence of the oxidizing agent at the temperature attained during the thermographic copying process, is first cleaved and the components then converted and re-combined to form an azo dye. However the dye formed has a much darker hue than would be expected on the basis of the particular components involved, and the degree of contrast obtained in the final copy is therefore much higher than might be anticipated.

A specific example of a composite compound which, in conjunction with a suitable oxidizing agent, has yielded an effective heat-sensitive copy-sheet capable of producing a deep purplish image on an essentially white background is the compound having the structural formula

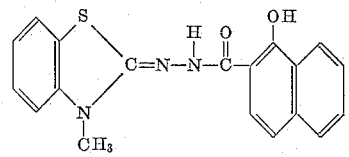

and which is identified as 3-methyl-2-benzothiazolinone 1'-hydroxy-2'-naphthoylhydrazone, melting at 194° C. Oxidative cleavage of such compound would be expected to yield a diazo fragment and a coupler component having the structures shown within the brackets and undergoing the coupling reaction here indicated:

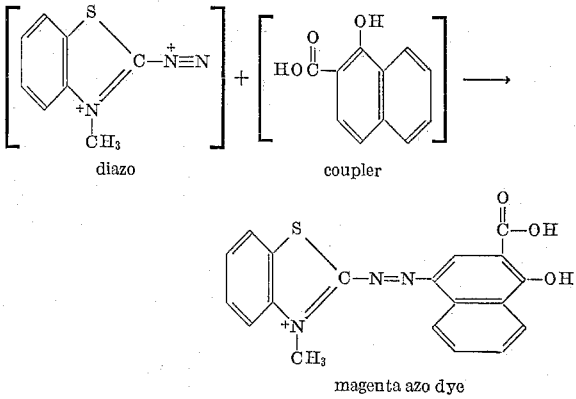

magenta azo dye

The formation of a deep purple or black rather than a magenta image in copy-sheets employing this composite compound suggests that some other or additional reaction takes place, possibly a coupling of the diazo fragment with the original composite. In any event, and regardless of theory, it has been found possible to produce effective copy-sheets with these composite compounds together with suitable oxidizing agents as the sole color-forming reactants, and therewith to produce surprisingly dark and high-contrast heat-image areas.

In addition, it is found that the composite hydrazone-coupler compounds as above described are significantly less colored than the corresponding simple mixture of hydrazone and coupler, so that the resulting copy-sheet may be made substantially white to provide maximum contrast between image and background areas. The composites are more effective than an equal weight of hydrazone-coupler mixture, permitting economy of materials and again leading to reduction of initial color in the sheet product. The color-forming reaction appears to be more rapid for the composite than for the separate reactants.

On the other hand, a much wider variety of formulations is possible with the separate hydrazone and coupler components than with the less readily available composite compounds, and fully effective copy-sheets have been prepared with such formulations. A typical composition includes 3-methyl-2-benzothiazolinone acetylhydrazone together with an oxidizing agent and an azo coupler component such as a phenol, naphthol, aromatic amine, or alpha-keto methylene coupler component, of which the naphthol-based "Naphthol AS" couplers are preferred. Additionally, the composite hydrazone-coupler compounds have themselves been found to be useful as coupler components in three-component systems employing the acetylhydrazone or analogous reactants.

Oxidizing agents for the oxidative cleavage of the hydrazone linkage which have been found useful in such heat-sensitive copy-sheet formulations include in particular certain organic amides and imides having a positive halogen atom attached to a nitrogen atom, a specific preferred example being N,N'-dichloro-N,N'-bis-(m-nitrobenzenesulfonyl)ethylenediamine. Although many such compounds are available as colorless, insoluble, high-melting solids which permit the preparation of normally stable, rapidly visibly reactive, essentially colorless heat-sensitive coatings, they all impart to such coatings an undesirable characteristic hypochlorite-like odor which is particularly noticeable on first opening a box or package containing several hundred sheets of the coated paper.

Other classes of oxidizing agents for the hydrazone linkage, including quinones, ozonides, and various metallic oxides and peroxides are strongly colored, or are difficult or dangerous to handle, or are unduly odorous, or form unstable coatings, or are otherwise not fully effective for incorporation in heat-sensitive copy-sheet formulations.

In accordance with the present invention, it has now been found that certain complex quaternary nitrogen organic persulfate compounds may be employed as oxidizing agents for the hydrazone linkage in copy-sheets of the class herein disclosed, to provide stability, reactivity, freedom from background color, ease of formulation, and other desired qualities fully equal to those obtained with the previously preferred N-halo amide and imide oxidizing agents, while in addition being essentially free from objectionable odor.

These new oxidizing agents are well represented by such exemplary compounds as bis(cetyldimethylphenacylammonium)persulfate and bis(2-benzamido-N-methylpyridinium)persulfate, and various analogous compounds in which the radicals attached to the quaternary nitrogen atom may be aliphatic, aromatic cyclic, or various combinations thereof. Such compounds are conveniently prepared by reaction of the appropriate tertiary nitrogen base with a quaternizing agent, e.g. dimethyl sulfate, alkyl halides, alkyl-p-toluenesulfonates, phenacyl halides or the like, followed by metathesis with an alkali persulfate in aqueous solution. The quaternary nitrogen persulfate precipitates and is readily recovered and further purified if necessary for subsequent use. Useful persulfates have by such procedures been prepared from: 2-benzamidopyridine, M. 76° C.; 2-p-chlorobenzamidopyridine, M. 137° C.; 2-p-nitrobenzamidopyridine, M. 238° C.; 2 - p - toluenesulfamidopyridine, M. 169–170° C.; 2-salicylamidopyridine, M. 209° C. The persulfates obtained are normally solid, insoluble or very sparingly soluble in water, colorless or only faintly colored, rapidly reactive with compounds such as 3-methyl-2-benzothiazolinone-1'-hydroxy-2'-naphthoylhydrazone in hot dilute slightly acidic solution, and melting at the temperatures here indicated:

bis(2-benzamido-N-methylpyridinium)persulfate, M. 167° C. (dec.)
bis(2-p-chlorobenzamido-N-methylpyridinium)persulfate, M. 175–179° C.
bis(2-p-nitrobenzamido-N-methylpyridinium)persulfate darkens 180–200° C., M. ca. 235° C.
bis(2-salicylamido-N-methylpyridinium)persulfate, M. 141° C.
bis(cetyldimethylphenacylammonium)persulfate, M. 116° C.

The copy-sheets are conveniently prepared by dispersing each of the reactants separately in extremely fine subdivision in a solution of a suitable resinous or polymeric binder, coating the dispersions either in a single mixture or in separate adjacent layers on a flexible support web, and removing the volatile liquid vehicle by evaporation at temperatures well below the activation temperature. Separate coatings are preferred for components of high reactivity, or to permit use of dissimilar binder and vehicle components for reactants of different solubilities, or to provide improved resistance to moisture, or to minimize the background color imparted by a colored reactant, or for other reasons. On the other hand, since single coatings require less time on the coating and drying equipment and permit lower amounts of material per unit area, it will ordinarily be advantageous to pre-mix the dispersions and apply the mixture in a single coating wherever possible. The coating may be permanently retained on the supporting web, e.g. as a thin surface layer on a paper backing, to provide an easily handled, rugged, opaque and economical product. However the coating may also be dried to a self-sustaining thin film form, e.g. on a polished metal drum, and then stripped therefrom to provide an exceptionally thin non-fibrous copy-sheet. Alternatively, the reactant materials may be incorporated within a fibrous web in the substantial absence of a separate binder.

The relative proportions of reactants have not been found to be critical, although stoichiometric amounts ordinarily give greatest efficiency. The amount of reactant within the reaction zone must obviously be sufficient to provide the desired visible change. Similarly, the amount of binder material is not critical so long as the composition is effectively retained in position on or within the sheet or film and produces effective visible change on heating. Nor does the specific nature of the binder have any significant influence on the operability of the copy-sheet, provided it is chemically inert, does not melt at temperatures reached in the copying process, and can be applied in volatile vehicles which do not themselves cause premature reaction of the reactant components of the coating.

A preferred form of heat-sensitive copy-paper consists of a thin transparent paper carrier web, a heat-sensitive coating, and a further visibly opaque white coating. The heat-sensitive coating produces a strong visible image in the thermographic reproduction process. The transparent paper permits viewing the image as a direct copy of the graphic original and also provides an effective marking surface for subsequent notations as desired. The surface layer affords a degree of physical protection for the heat-sensitive layer and provides an opaque white background against which the image areas have maximum contrast.

In some cases contrast may similarly be improved by incorporation of suitable inert pigments, fillers or the like within the heat-sensitive layer. Other materials may also be added in this way; and particular advantages are frequently obtained by the incorporation of fusible organic materials. Many fusible mild reducing agents such as benzoin and benzoin oxime, for example, have been found to lower the copying temperature required while at the same time improving the stability of the copy-sheet against slight darkening or discoloration under storage or in use. Various other fusible materials are similarly effective in improving the reactivity of the sheet in the copying process, without, however, improving the sheet stability to a corresponding degree. Alternatively, additives of these types make possible the preparation of effective copy-sheets with reactants which in the absence of such additives would require such high temperatures or such prolonged reaction times as to be commercially unacceptable. Benzoic acid, benzene sulfonamide, benzamide, urea, and various waxes, fusible in the approximate range 110–155° C., are exemplary.

Proton donor additives such as carboxylic and sulfonic acids, and compounds providing silver ions and the like, are particularly useful in conjunction with the quaternary persulfate oxidizing agents in enhancing and accelerating the oxidizing action and thereby increasing the rate or decreasing the temperature at which darkening of the copy-sheet occurs during the thermographic copying process. Stearic acid, benzilic acid, 3-nitrophthalic acid, and silver behenate are representative of such additive materials, being employed in essentially catalytic small quantities.

The temperatures attained at the heat-sensitive layer during thermographic reproduction are difficult to measure directly, and indirect methods have therefore been developed. It has thus been shown that copy-sheets which effectively visibly change on brief contact with a metal test bar heated to a temperature within the approximate range of 90–150° C., and which are not significantly discolored within about two hours at about 50° C., will be found acceptable for making reproductions of typewritten correspondence or the like in commercially available thermographic copying apparatus.

One form of the copy-sheet of the invention is illustrated in partial cross-section in the appended drawing.

Exemplary heat-sensitive copy-sheets and methods of making the same will now be described.

*Example 1*

2-aminopyridine (94 grams, 1 mol) in pyridine (200 ml.) is treated dropwise with benzoyl chloride (140 g., 1 mol) with continuous stirring and cooling. The reaction mixture is heated and stirred on a steam bath for one-half hour to complete the reaction and is then poured into a mixture of ice and water. The precipitated 2-benzamidopyridine product is collected, washed with water, and dried. A sample is crystallized from heptane and is found to have a melting point of 76° C.

A mixture of 2-benzamidopyridine (147 g., 0.74 mol) prepared as just described, and dimethyl sulfate (70 g., 0.75 mol) is heated with stirring to yield a clear melt and initiate an exothermic reaction. The mixture is allowed to stand for ten minutes and is then poured into 500 ml. of acetone and cooled. The resulting crystalline 2-benzamido-N-methyl-pyridinium methosulfate product is collected, washed with acetone and dried.

2-benzamido-N-methylpyridinium methosulfate (33 g., 0.1 mol) prepared as described is dissolved in water (100 ml.). To the solution is added with stirring a solution of potassium persulfate (13.5 g., 0.05 mol) in warm water (200 ml.). A white crystalline precipitate is immediately formed; it is recovered from the cooled liquid, washed with water and with acetone, and dried. A sample melts at 167° C. with decomposition; it is bis-(2-benzamido-N-methylpyridinium)persulfate having the formula

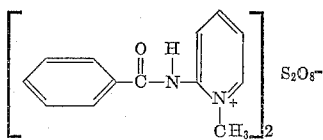

Twenty-five grams of this product is ground in a ball mill into a solution, in 100 ml. of commercial heptane, of 5 g. of a copolymer of equal parts styrene and isobutylene (Parapol S–50).

3-methyl - 2 - benzothiazolinone-1'-hydroxy-2'-naphthoylhydrazone is prepared by heating together 3-methyl-2-benzothiazolinone hydrazone (94.5 g.) and phenyl-1-hydroxy-2-naphthoate (135 g.) under vacuum at 160–170° C. until distillation of phenol ceases. The product, recovered from admixture with chlorobenzene, washed with benzene and with petroleum ether, and dried, melts at 194° C. Eighteen grams of the dry product is ground in a ball mill into a solution, in 100 ml. of commercial heptane, of 5 grams of Parapol S–50 copolymeric binder.

Equal weights of each of the two grinds are uniformly mixed together and applied in a thin uniform layer to map overlay tracing paper, e.g. by means of a bar or knife spreader or a Mayer equalizer bar, and the coating is dried in a current of air at room temperature. The resulting coated sheet material is white in color and forms dense purple-black image areas when heated in the thermographic printing process or by momentary contact with a metal test bar heated at about 120° C.

The addition to the coating mixture of small amounts of benzilic acid produces a copy-sheet with which the visible image may be formed somewhat more rapidly or at a somewhat lower temperature.

Application over the coated surface of a second thin coating of three parts of titanium dioxide pigment in two parts of the polymeric binder provides a protective surface layer and improves the contrast of the image areas as viewed through the essentially transparent paper carrier sheet, but is not essential.

The coated copy-sheet products of this example are substantially free of objectionable odor.

The activity of the reactants employed may be demonstrated by a solution test. A small amount of each of the bis-(2-benzamido-N-methylpyridinium)persulfate and of the 3-methyl-2-benzothiazolinone-1'-hydroxy-2'-naphthoylhydrazone are dissolved together in a few ml. of dimethylformamide in a test tube. A few drops of acetic acid are added and the mixture heated. A deep reddish purple color is formed.

The preparation of additional specific illustrative condensation composites of heterocycic hydrazones and their application to the preparation of heat-sensitive copy-sheets useful in the thermographic copying process will now be described.

*Example 2*

A mixture of 18.9 grams of 3-methyl-2-benzothiazolinone hydrazone and 75 ml. of o-dichlorobenzene is heated at reflux for 24 hours. The effluent vapor is identified as hydrazine. The reaction mixture is diluted with xylene, cooled, filtered, and the product washed with petroleum ether and recrystallized from xylene. The white crystals melt at 260° C. and are identified as 3-methyl-2-benzothiazolinone azine.

Diphenyl ether, 2-aminopyridine, or other inert high-boiling liquid diluents may replace the o-dichlorobenzene in providing a liquid system for ensuring effective control of the reaction.

The azine is preferably employed in conjunction with both the hydrazone and the persulfate components of Example 1 in producing a heat-sensitive copy-sheet. Omitting the hydrazone provides a copy-sheet which produces a less intense but still useful coloration when locally heated in the thermographic copying process.

Example 3

A stable, high-melting derivative of 3-methyl-2-benzothiazolinone hydrazone is prepared by dropwise addition of 13.5 g. of phenyl isothiocyanate to a hot solution of 18.9 g. of the hydrazone in 200 ml. of ethanol with constant stirring. Heating is continued for one-half hour after addition is completed. The resulting white crystals are collected, washed with ethanol and with petroleum ether, and dried. The melting point is 168–175° C. and the product is identified as 3-methyl-2-benzothiazolinone 4'-phenylthiosemicarbazone.

A copy-sheet prepared with the semicarbazone in place of the hydrazone of Example 1 produces a blue-green image on brief heating to conversion temperature.

Example 4

A solution of 18.9 g. of 3-methyl-2-benzothiazolinone hydrazone in 200 ml. of hot water containing 10 ml. of concentrated hydrochloric acid is added slowly with stirring to a solution of 10 g. of potassium cyanate in 100 ml. of water and 50–100 g. of ice. After standing for one-half hour the crystalline product is collected, washed and dried. It melts at 208–210° C. and is identified as 3-methyl-2-benzothiazolinone semicarbazone.

With this condensation composite a separate azo coupler component, for example one of the naphthol couplers such as "Naphthol AS–SW," is required in order to obtain the desired color change by oxidative coupling, whereas in the compositions of Examples 1–3 the compound containing the hydrazone linkage itself provides the coupler moiety.

Example 5

The compound 3-methyl-2-benzothiazolinone acetylhydrazone, M. 258° C., is prepared by dropwise addition of 40 ml. of acetic anhydride to a hot solution of 20 g. of 3-methyl-2-benzothiazolinone hydrazone, M. 135° C., in 200 ml. of benzene. With this compound is used an equal amount by weight of H-acid, i.e. 1-amino-8-hydroxynaphthalene-3,6-disulfonic acid as the coupler component, together with the persulfate oxidizing agent identified in Example 1.

Analogous amide or equivalent condensation products of the hydrazone and other organic acids, e.g. octanoic acid, tetradecanoic acid, benzoic acid, naphthoic acid, phenoxyacetic acid, p-toluenesulfonic acid, likewise are high in melting point and have low solubility in the solvents used with the binder resins, and provide effectively stable coatings for many purposes. The hydrochloride salt is also somewhat improved over the unmodified hydrazone in this respect.

Example 6

An azine condensation composite is prepared by mixing together a solution of 18.9 grams of 3-methyl-2-benzothiazolinone hydrazone in 200 ml. of hot absolute ethanol and a solution of 20 g. of 2,4-dihydroxybenzaldehyde in 50 ml. of the same solvent. The mixture is heated with stirring for one-half hour and is then cooled. The resulting product is collected, washed with ethanol and with petroleum ether, and dried to yield a light tan solid melting at 240–243° C. and which may be identified as 3-methyl-2-benzothiazolinone 2',4'-dihydroxybenzal azine.

The azine compound undergoes oxidative coupling to form a visible image when combined with a persulfate oxidizing agent in copy-sheet form and locally heated as described in Example 1. The inclusion of 3-methyl-2-benzothiazolinone acetylhydrazone in the coating formulation improves the image density and sheet stability.

Many other equivalent condensation derivatives of heterocyclic hydrazones may analogously be prepared and, in conjunction with the persulfate oxidizing agents and other reactants as required, may be employed in the preparation of useful heat-sensitive thermographic copy-sheet materials which are free of objectionable hypochlorite-like odor and may be essentially colorless. In all instances the condensation will be seen to involve reaction at the amino nitrogen atom of the heterocyclic hydrazone. Accordingly, condensations of the hydrazono compound with organic sulfonic or carboxylic acids or corresponding acid chlorides or phenyl esters, or with isocyanates, isothiocyanates, hydrazones or other compounds having amine-reactive groups, under typical conditions for such reactions as illustrated in the pertinent examples, are useful in the preparation of condensation composites suitable for incorporation in the copy-sheets of this invention. Where the composite is readily cleaved on oxidation and provides both a diazonium fragment and a coupler fragment, or where oxidation otherwise results in azo dye formation, or where the oxidizing agent itself provides an azo coupler component, no additonal coupler component is required although additional coupler may be added if desired. On the contrary, where the composite compound includes a coupler fragment, the compound may itself serve as the coupler moiety in conjunction with an oxidizable heterocyclic hydrazone.

Since the hydrazone linkage rather than the heterocyclic ring is responsible for the diazo group with which the coupling reaction takes place, it will be appreciated that many similar but specifically different heterocyclic structures may be substituted for the 3-methyl-2-benzothiazolinone structure of the foregoing hydrazone compounds and derivatives. The hydrazone must be such as to provide a visibly distinct compound when oxidized and coupled, and must have the necessary physical properties for stability in the coating composition and in the copy-sheet. Thus there may be substituted for the sulfur radical of the benzothiazolinone structure such radicals as —Se—, —O—, —NCH$_3$—, and —CH=CH—. The benzene ring may be converted to a cyclohexene ring, and these or other cyclic side srtuctures, where present, may be further substituted e.g., with —SO$_3$H, —OCH$_3$, —CH$_3$, or —Cl radicals.

The structural formulas of the preferred heterocyclic hydrazones may therefore be indicated as

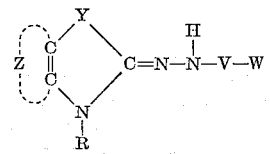

or

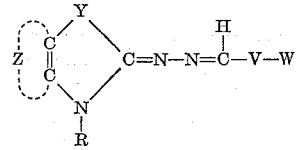

or

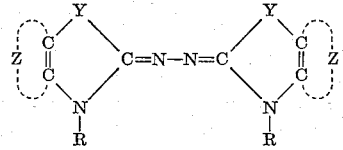

wherein:

Z represents the remaining atoms of a cyclic structure;
R is alkyl;
Y is —S—, —Se—, —O—,

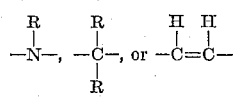

V is

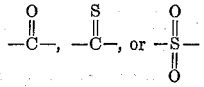

and W is alkyl, aryl, alkoxy, alkoxyalkyl, aryloxyalkyl, amino, arylamino, or substituted aryl with or without an active coupling position on an aromatic ring, with the further provision that, where W is arylamino, V must be

Equivalent compounds in which the heterocyclic ring contains no cyclic substituents are also useful and are included within the scope of the invention, but such compounds ordinarily produce less intensely colored azo dye reaction products and accordingly are less desirable in heat-sensitive copy-sheet formulations.

Specific exemplary compounds coming within the ambit of the foregoing structure or equivalent thereto include:

3-methyl-2-benzothiazolinone tetradecanoylhydrazone;
3-methyl-x-sulfo-2-benzothiazolinone hydrazone or acetylhydrazone (wherein the x signifies that the specific position of the sulfo group on the benzene ring is uncertain);
3-methyl-2-benzoselenazolinone acetylhydrazone;
3-ethyl-2-benzoxazolinone benzenesulfonylhydrazone;
1,3-dimethyl-5-methoxy-2-benzimidazolinone benzoylhydrazone;
3-methyl-4,5,6,7-tetrahydro-2-benzothiazolinone acetylhydrazone;
1-methylcarbostyril phenoxyacetylhydrazone;
2-methylisocarbostyril acetylhydrazone;
3,3-dimethyl-1-ethyloxindole octanoylhydrazone;
1-methylnaphtho(1,2-d)thiazolin-2-one acetylhydrazone;
3-methyl-2-benzothiazolinone methanesulfonylhydrazone;
3-methyl-2-benzothiazolinone acetylhydrazone;
3-methyl-2-benzothiazolinone semicarbazone;
3-methyl-2-benzothiazolinone p-toluenesulfonylhydrazone; and
3-methyl-2-benzothiazolinone carbethoxyhydrazone.

As has previously been indicated, the composite hydrazone-coupler compounds are useful also as couplers and in fact may well react in that capacity with the diazo component liberated from a portion of the composite compound on oxidation thereof. More particularly, however, these composite products are themselves capable of providing both the diazo component and the azo coupler component, and thus provide stable copy-sheets of improved contrast and reactivity with reduced amounts of reactive materials. Included among such composites are the following:

3-methyl-2-benzothiazolinone 1'-hydroxy-2'-naphthoylhydrazone;
3-methyl-2-benzothiazolinone 2'-hydroxy-3'-naphthoylhydrazone;
3-methyl-2-benzothiazolinone 1'-phenyl-5'-pyrazolone-3'-carbonylhydrazone;
3-methyl-2-benzothiazolinone benzoylacethydrazone;
3-methyl-2-benzothiazolinone 2' naphthol-7'-sulfonylhydrazone;
3-methyl-2-benzothiazolinone salicylylhydrazone; and
3-methyl-4,5,6,7-tetrahydrobenzothiazolinone 1-hydroxy-2-naphthoylhydrazone.

Still another class of condensation composite compounds which by themselves on oxidation are capable of providing colored reaction products and which impart improved stability and contrast and at reduced concentration are represented by compounds such as:

3-methyl-2-benzothiazolinone azine;
3-methyl-2-benzothiazolinone 2'-salicylal azine;
3-methyl-2-benzothiazolinone 2',4'-dihydroxybenzal azine;
3-methyl-2-benzothiazolinone 2'-hydroxy-5'-chlorobenzal azine, and
3-methyl-2-benzothiazolinone 4'-phenylthiosemicarbazone.

As noted hereinbefore, phenols, naphthols, aromatic amines and alpha-keto methylene couplers are all useful in these copy-sheet formulations, but materials of the "Naphthol AS" 3-hydroxy-2-naphthoic arylamide class of azo coupling components have been found particularly desirable both as components of the composite hydrazone-coupler compounds and as components of formulations in which the heterocyclic hydrazone component and the coupler component are independent. Representative examples of coupler components useful in particular in the latter type of formulations are as follows:

2-hydroxy-3-naphthanilide;
N-(2-naphthyl)-2-hydroxy-3-naphthamide;
N-(2-chloro-4-methylphenyl)-2-hydroxy-3-naphthamide;
N-(2,5-dimethoxyphenyl)benzoylacetamide;
1-phenyl-3-methyl-5-pyrazolone;
1-phenyl-3-amino-5-pyrazolone;
S-acid; H-acid; N-phenyl-J-acid;
Salicylanilide; Salicylamide;
N-(2-naphthyl)-1-hydroxy-2-naphthamide;
Ethyl 1-hydroxy-2-naphthoate;
Phenyl 1-hydroxy-2-naphthoate; and
4,4'-bi-o-acetoacetotoluidide.

What is claimed is as follows:

1. A heat-sensitive copy-sheet capable of undergoing visible change on brief contact with a metal bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) a normally solid organic quaternary nitrogen persulfate oxidizing agent for the hydrazone linkage and further characterized as being rapidly reactive with 3-methyl-2-benzothiazolinone-1'-hydroxy-2'-naphthoylhydrazone in hot dilute slightly acidic solution with production of a deep reddish purple color, said layer including an azo coupler component, said components (a) and (b) being maintained in physically distinct, chemically inter-reactive relationship, said copy-sheet being stable under normal office storage and use conditions.

2. The copy-sheet of claim 1 in which the said amine-reactive organic compound is an azo coupler component.

3. A heat-sensitive copy-sheet capable of undergoing visible change on brief contact with a metal bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, (b) a normally solid azo coupler component, and (c) a normally solid organic quaternary nitrogen persulfate oxidizing agent for the hydrazone linkage and further characterized as being rapidly reactive with 3-methyl-2-benzothiazolinone-1'-hydroxy-2'-naphthoylhydrazone in hot dilute slightly acidic solution with production of a deep reddish purple color, said components (a), (b) and (c) being maintained in physically distinct, chemically inter-reactive relationship, said copy-sheet being stable under normal office storage and use conditions.

4. A heat-sensitive copy-sheet capable of undergoing visible change on brief contact with a metal bar heated to a temperature within the approximate range of 90–150° C. and suitable for the thermographic reproduction of differentially radiation-absorptive graphic originals as herein described, comprising, in order, a paper-like carrier, a thin visibly heat-sensitive layer, and a protective surface coating; said heat-sensitive layer comprising (a) a normally solid condensation composite of a heterocyclic hydrazone and an amine-reactive organic compound, and (b) a normally solid organic quaternary nitrogen persulfate oxidizing agent for the hydrazone linkage and further characterized as being rapidly reactive with 3-methyl-2-benzothiazolinone-1'-hydroxy - 2'-naphthoylhydrazone in hot dilute slightly active solution with production of a deep reddish purple color, said layer including an azo coupler component, said components (a) and (b) being maintained in physically distinct, chemically inter-reactive relationship, said copy-sheet being stable under normal office storage and use conditions.

5. A heat-sensitive copy-sheet capable of undergoing visible change on brief contact with a metal bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) bis(2-benzamido-N-methylpyridinium)persulfate, said components (a) and (b) being maintained in physically distinct, chemically inter-reactive relationship, said copy-sheet beng stable under normal office storage and use conditions.

6. A heat-sensitive copy-sheet capable of undergoing visible change on brief contact with a metal bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) bis(2-p-chlorobenzamido-N-methylpyridinium)persulfate, said components (a) and (b) being maintained in physically distinct, chemically inter-reactive relationship, said copy-sheet being stable under normal office storage and use conditions.

7. A heat-sensitive copy-sheet capable of undergoing visible change on brief contact with a metal bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of heterocyclic hydrazone and an amine-reactive organic compound, and (b) bis(2-p-nitrobenzamido-N-methyl-pyridinium) persulfate, said components (a) and (b) being maintained in physically distinct, chemically inter-reactive relationship, said copy-sheet being stable under normal office storage and use conditions.

8. A heat-sensitive copy-sheet capable of undergoing visible change on brief contact with a metal bar heated to a temperature within the approximate range of 90–150° C. and suitable for the thermographic reproduction of differentially radiation-absorption graphic originals as herein described, comprising a thin flexible sheet material including a visibly heat-sensitive layer comprising (a) a normally solid condensation composite of a heterocyclic hydrazone and an amine-reactive organic compound, and (b) bis(2 - salicylamido-N-methylpyridinium)persulfate, said components (a) and (b) being maintained in physically distinct, chemically inter-reactive relationship, said copy-sheet being stable under normal office storage and use conditions.

9. A heat-sensitive copy-sheet capable of undergoing visible change on brief contact with a metal bar heated to a temperature within the approximate range of 90–150° C. and suitable for hte thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) bis(cetyldimethylphenacylammonium)persulfate, said components (a) and (b) being maintained in physically distinct, chemically inter-reactive relationship, said copy-sheet being stable under normal office storage and use conditions.

References Cited in the file of this patent

UNITED STATES PATENTS

| | | |
|---|---|---|
| 2,967,784 | Newman et al. | Jan. 10, 1961 |
| 3,076,721 | Coles et al. | Feb. 5, 1963 |